United States Patent [19]
Clenet

[11] 4,040,656
[45] Aug. 9, 1977

[54] BUG DEFLECTOR

[76] Inventor: Alain Jean-Marie Clenet, 160 Santo Tomas Lane, Montecito, Calif. 93108

[21] Appl. No.: 585,845

[22] Filed: June 11, 1975

[51] Int. Cl.² .............................................. B60J 1/20
[52] U.S. Cl. .................................................... 296/91
[58] Field of Search ............ 296/91, 1 S, 95 R, 95 Q, 296/137 J, 137 B, 137 E; 108/37, 44, 136

[56] References Cited

U.S. PATENT DOCUMENTS

| | | | |
|---|---|---|---|
| 1,799,267 | 4/1931 | Walton | 296/95 R |
| 2,400,958 | 5/1946 | Simmons | 296/95 Q |
| 2,757,954 | 8/1956 | Hurley | 296/91 |
| 2,823,072 | 2/1958 | Podolan | 296/91 |
| 3,215,377 | 11/1965 | Jarecki | 296/91 X |

FOREIGN PATENT DOCUMENTS

| | | | |
|---|---|---|---|
| 1,121,035 | 2/1955 | France | 296/91 |
| 1,019,574 | 11/1957 | Germany | 296/91 |
| 734,743 | 8/1955 | United Kingdom | 296/91 |

*Primary Examiner*—Robert J. Spar
*Assistant Examiner*—Winston H. Douglas
*Attorney, Agent, or Firm*—Lindenberg, Freilich, et al

[57] ABSTRACT

A deflector which mounts on the hood of a vehicle to deflect bugs and dust away from the windshield during normal driving, and which is automatically stored flat against the hood when the vehicle is stopped or moving slowly. The deflector includes a pair of sheet-like members pivotally mounted on the front of the hood, so that they are lifted up by air moving over the hood during forward vehicle movement, or by a driver-operated vacuum cylinder.

2 Claims, 6 Drawing Figures

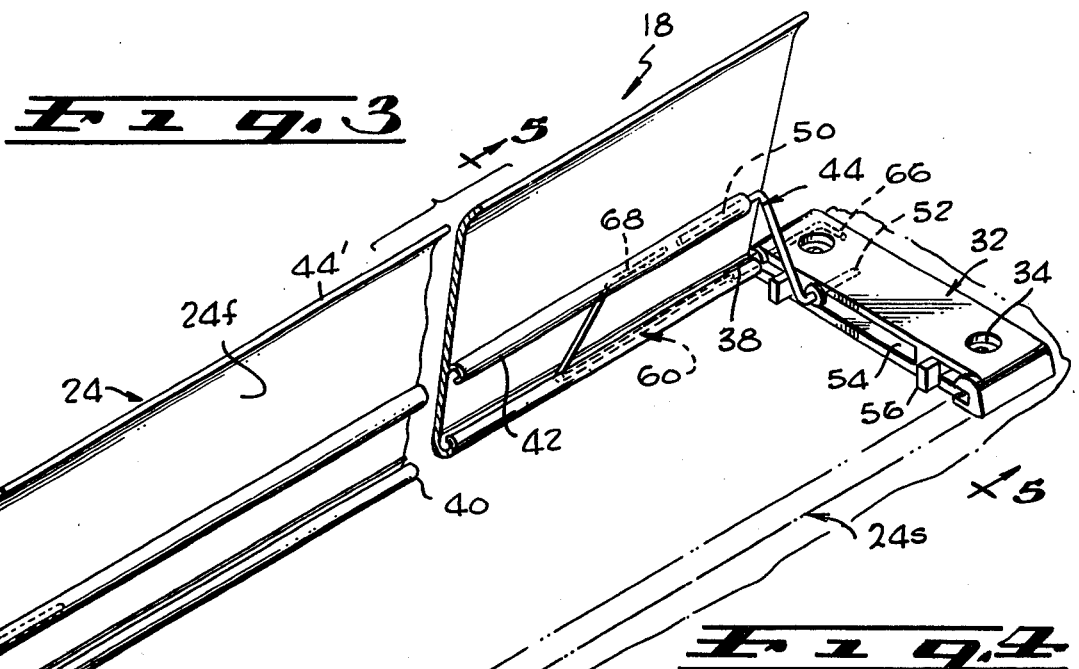
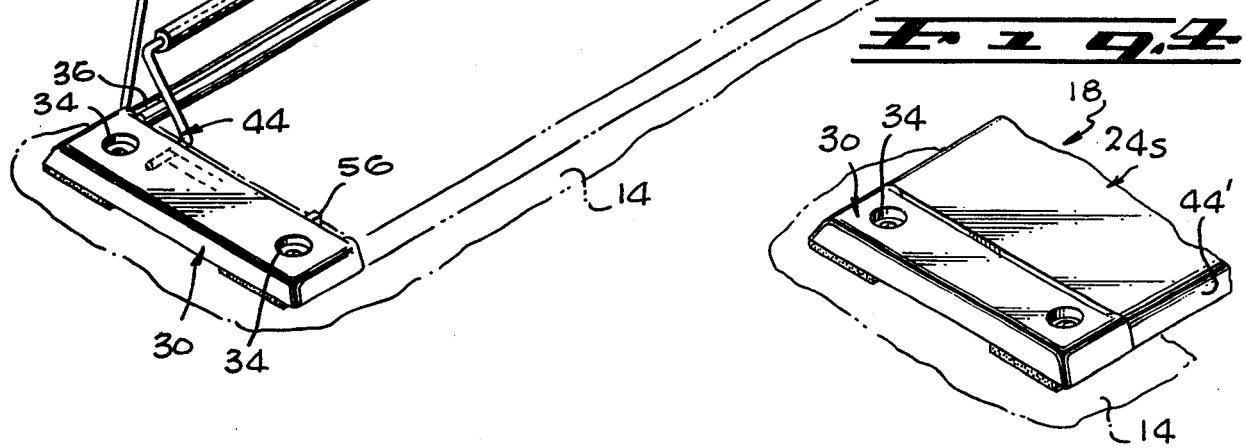
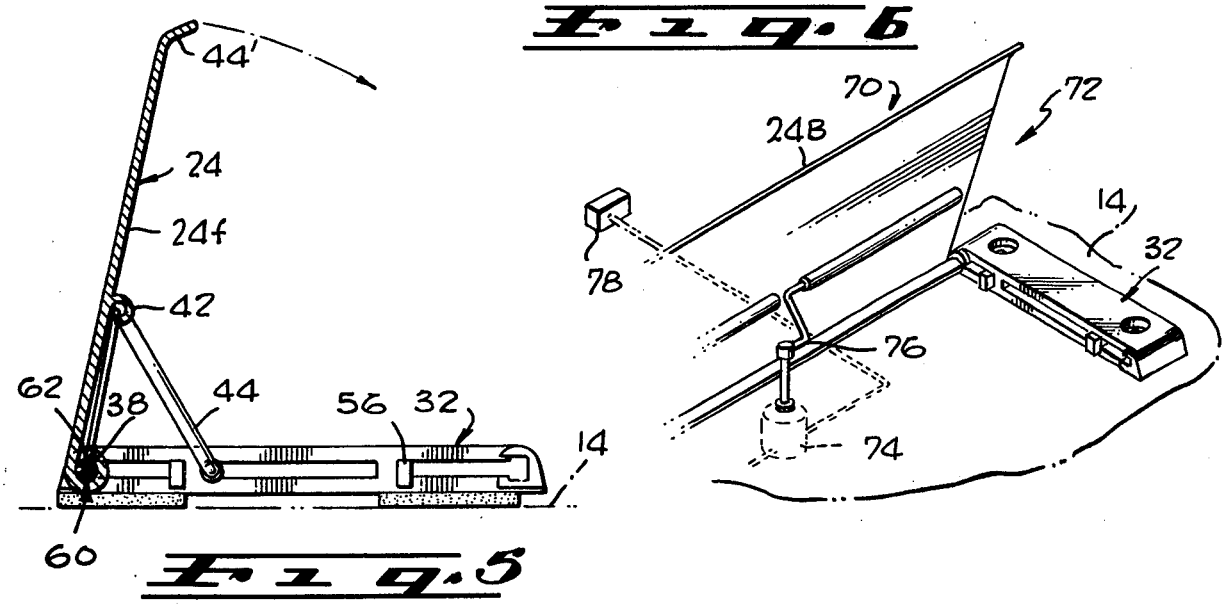

BUG DEFLECTOR

BACKGROUND OF THE INVENTION

This invention relates to a deflector designed for mounting on the hood of a vehicle to deflect windshield-blockable material away from the windshield.

In many areas of the country, windshield protecting devices are utilized to prevent insects from blocking the windshield of vehicles. A screen or transparent plastic shield can be fixed in an upright position on the hood to intercept insects and also to help create an updraft of air so that the air currents and insects therein are deflected over the windshield. However, such devices are less than satisfactory. The deflectors must be removed prior to washing a vehicle in carwashes which employ a rotating brush that moves over the hood and roof of the vehicle. In addition, the bug-caked deflectors are unsightly and can interfere with vision of the driver. Even when an upstanding deflector is clean, it greatly detracts from the appearance of the vehicle. A deflector for deflecting bugs and dust from the windshield of a vehicle, which is automatically stored when the vehicle is stopped or moving at low speeds, would be of considerable value in those parts of the country where deflectors are useful.

SUMMARY OF THE INVENTION

In accordance with one embodiment of the present invention, a deflector apparatus is provided which is stored in a neat manner during low vehicle speed and which is automatically deployed at moderate speed to efficiently deflect bugs and other debris from the windshield of a vehicle. The apparatus includes a pair of sheet-like deflector members pivotally mounted near the front of the hood and urged by a spring to a down position wherein the sheets lie substantially flat against the hood. At moderate vehicle speed, the updraft of air deflected by the front of the vehicle, moves the deflector upward towards a largely vertical position. The deflector thereafter deflects air upwardly so that debris tends to be carried over the windshield.

The novel features of the invention are set forth with particularity in the appended claims. The invention will be best understood from the following description when read in conjunction with the accompanying drawings.

BRIEF DESCRIPTION OF THE DRAWINGS

FIG. 3 is a perspective view of one of the deflectors of FIG. 1, shown in an upward or deployed condition;

FIG. 4 is a perspective view of a portion of the deflector of FIG. 3, shown in a downward or stored condition;

FIG. 5 is a view taken on the line 5—5 of FIG. 3;

FIG. 6 is a partial perspective view of another embodiment of the invention.

DESCRIPTION OF THE PREFERRED EMBODIMENTS

Figure 1:
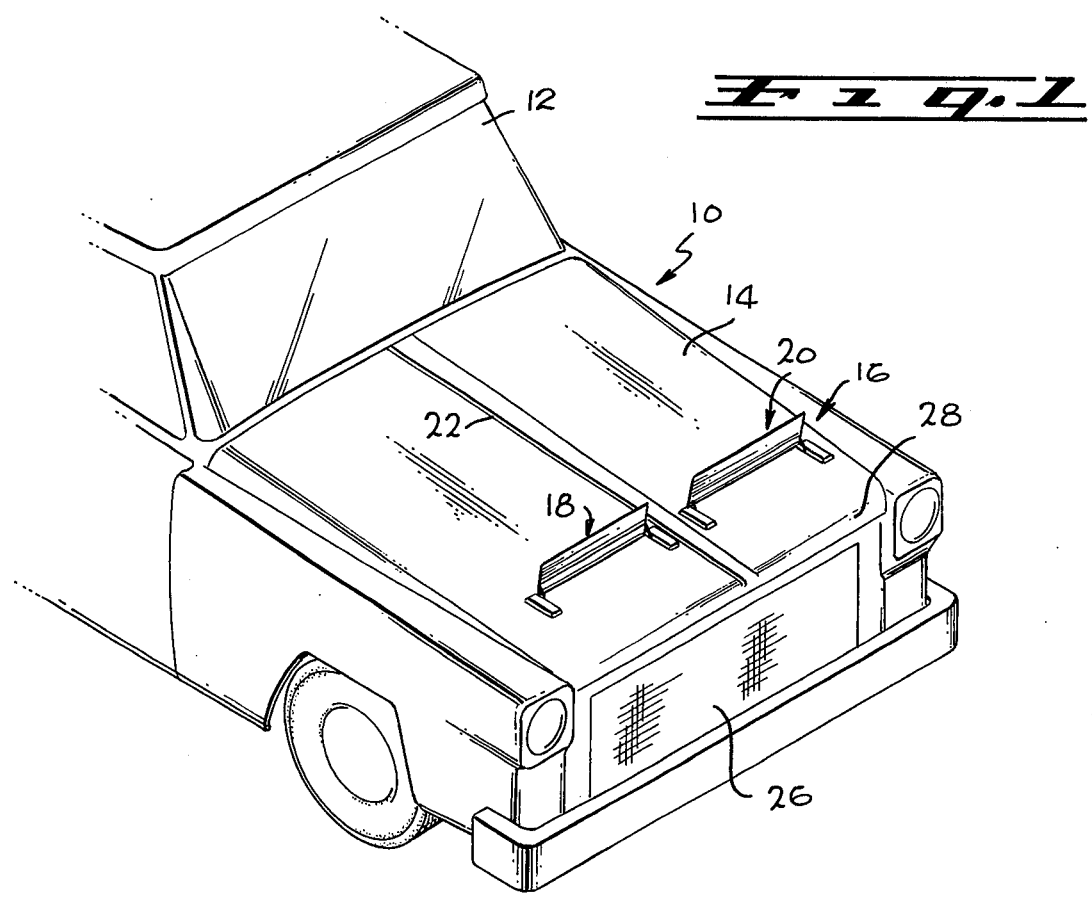
FIG. 1 is a perspective view of a deflector of the present invention, shown installed on a vehicle and in an upward or deployed condition.
Figure 2:
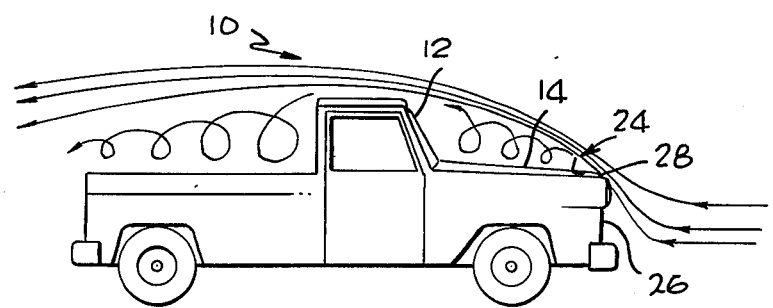
FIG. 2 is a side view of the deflector and vehicle installation of FIG. 1.

FIGS. 1 and 2 illustrate a vehicle 10 with a windshield 12 and a hood 14 extending in front of the windshield, and also showing deflector apparatus 16 of the present invention mounted on the top of the hood near the front thereof. The deflector apparatus 16 includes a pair of laterally-extending deflector devices 18, 20 mounted on either side of a center ridge 22 which extends longitudinally along the middle of the hood. Each deflector device includes a deflector member 24 which can pivot up to the position illustrated in FIGS. 1 and 2 to protect the windshield from insects or other airborne material. As shown in FIG. 2, the front 26 of a vehicle deflects the air so that a high pressure area is created at the forward curve or corner 28 of the vehicle where the top and front of the hood meet, this corner extending primarily laterally, or in other words, along the width of the vehicle. The deflector member 24 which is located close behind this corner 28, deflects the air upwardly so that it tends to rise above the windshield and to carry insects and other debris over the windshield. The deflector member 24 is of relatively low height, so that it blocks only a small area at the bottom of the driver's field of view, which is an area of no significant importance during rapid vehicle motion. The deflector devices 18, 20 are designed so that the deflector member 24 pivots downard to a position flat on the hood when the vehicle is moving slowly or not at all, which is the only time when it is important for the driver to be able to see objects close to the front of the vehicle.

As also illustrated in FIGS. 3-5, each deflector device such as 18 includes a holder formed by a pair of hold members 30, 32 at opposite ends of the deflector member 24, which mounts on the hood of a vehicle and which pivotally support the deflector member 24. Each hold member such as 30 includes a pair of screw holes 34, which receive a screw that is fastened to the hood of the vehicle, and each holder includes a roll pin 36, 38 which pivotally supports the rearward edge 40 of the deflector member. The deflector member 24 is an extruded aluminum member of substantially constant cross-section along its length, with its rearward edge portion 40 bent into most of a circle, to pivotally receive the pins 36, 38. A middle portion of the deflector member, at 42, is also formed into most of a circle to receive an end of a Z-bar 44, as will be explained blow. The reason why the rearward edge 40 and middle portion 42 of the deflector member are formed with less than a complete circle is to permit the reception of a core therein during the extrusion process in which the deflector member 24 is formed. The forward edge 44 of the deflector member is formed to extend largely downwardly, when the rest of the sheet-like deflector member 24 is in its downward position wherein it lies substantially horizontal and flat against the hood of the vehicle.

The Z-bar 44 serves as a stop which limits backward pivoting of the deflector member 24 to the position shown in FIG. 3. The bar 44 has an outer end 50 whichis pivotally received in the middle portion 42 of the deflector member, and has an inner end 52 which is slideably received in a slot 54 of one of the hold members 32, the two ends being bent at a right angle with respect to the middle of the bar. When the deflector member 24 pivots up, the inner end of the Z-bar 44 hits the rearward end wall of the slot 54, to thereby prevent any further upward or rearward pivoting of the deflector member. When the deflector member pivots down, it rests on bosses 56 of the hold members.

In order to assure that the deflector member 24 will pivot down to its storage position when the vehicle is moving slowly or stopped, a spring 60 is provided which urges the deflector member to pivot down to its storage position as shown at 24s. The spring 60 is a spring wire with a middle portion 64 which extends through the center of one of the pins 36 which pivotally supports the deflector member. Each of the pins 36, 38 is a roll pin (FIG. 5) which has a hole 62 along its axis, and the hole in pin 38 receives the middle portion of the wire 60. An inner end 66 of the wire is bent out of line with the straight middle portion and is captured in the hold member 32. The outer end 68 of the spring wire is also bent out of line with the middle portion and is captured in the middle deflector member portion 42. The spring wire tends to rotate so that the outer end portion 68 lies horizontal, and therefore tends to pivot the deflector member 24 downwardly. Of course, it is possible to provide a weighted portion of the deflector member to pivot it downwardly, but the spring 60 provides this function in a simple and inexpensive manner.

When the vehicle is stopped or moving slowly, the deflector member 24 lies almost flush with the hood. The bent-over forward edge 44 prevent the appearance of a gap and therebyprovides a neat appearance. As the vehicle gains forward speed, an upward movement of air past the area near the corner 28 of the vehicle results in a lifting force on the deflector member 24. At a speed such as 28 mph, the upward lift of air overcomes the downward force of the springwire, and the deflector member lifts up. Once the deflector is up, its air resistance is increased, and it will not move down again unti the vehicle speed is reduced below a lower level such as 18 mph, whereby avoiding repeated lifting and falling of the deflector member at some critical speed.

The deflector devices 18, 20 can be readily installed on the hood of a vehicle and their deflector members will remain flat substantially against the hood so that they do not detract appreciably from the appearance of the vehicle and, in fact, may enhance the appearance. The vehicle can be washed in a common carwash which has a rotating horizontal brush which rotates on the hood and top of the vehicle, since the deflector members will remain in their down position. During vehicle travel in rural areas, either on the road where insects are a major problem or off the road where dust is a major problem, the deflector will automatically move up and deflect most of the encountered debris away from the windshield. Any insects that hit the front face 24f of the deflector member or any dust particles that tend to pit the front face, will not detract from the appearance or front view from the vehicle when it is parked, since this face 24f will be hidden.

The deflector device such as 18 can be constructed in a simple manner, by utilizing a deflector member 24 of extruded metal. Each of the two hold members 30, 32 have identical bodies which are symmetric about their center, so that manufacture and assembly of the device is easily accomplished. Deflector devices of the construction illustrated in the drawings, have been constructed with a length of about two feet to fit on either side of the center ridge 22 of a vehicle, and with a width of about three inches, and have been found to function effectively as described herein.

It is often desirable to provide a way for keeping the deflector member 24 in its down position during city driving or during driving in the country in a season when insects or other debris are not encountered in great numbers. A simple stop can be provided to hold down the deflector member 24. If it is desired to enable unlocking as well as raising and lowering of the deflector member from within the car, then an installation of the type illustrated at 70 in FIG. 6 can be utilized. In FIG. 6, a deflector device 72 is provided with employs a vacuum cylinder 74 connected by an arm 76 to the deflector member 24B, to permit raising and lowering of the deflector member from within the car, by operating a switch 78 under the dashboard.

Thus, the invention provides a deflector apparatus which is of simple construction and which permits washing of a vehicle and unobstructed viewing of the region immediately in front of the vehicle when the vehicle is stopped or moving slowly, and yet which is effective to deflect debris away from the windshield of the vehicle during normal moderate to high speed driving. This is accomplished by the use of a deflector with a pivotally mounted member which can pivot up and down. A simple installation can be provided by constructing the device so that it is moved up by the wind, reliable upward pivoting being enhanced by mounting the deflector member close to the forward corner of the hood where the largely horizontal top of the hood meets the largely vertical front of the hood.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A vehicle deflector installation, comprising:
   a vehicle having a windshield and a hood extending forward of the windshield;
   at least one elongated deflector member extending laterally along the width direction of said hood, said deflector member having a rearward edge portion pivotally mounted on said hood and a forward edge portion, said deflector member normally lying substantially flat on said hood but pivotal to a primarily vertical orientation;
   said deflector member comprises a member (24) of substantially constant cross-section, with said rearward edge portion (40) forming most of a circle with a hole therein, and with a middle portion (42) forming most of a circle with a hole therein; and including
   a pair of hold members (30, 32) at opposite ends of said deflector member, each hold member having a pin (36, 38) pivotally received in said hole of said rearward edge portion of said deflector member;
   a wire spring (60) with a middle portion extending through one of said pins (38) and having opposite ends (66, 68) bent out of line with said middle portion and respectively held on a first hold member (32) and said deflector member; and
   a Z-bar (44) having an outer end (50) pivotally received in said middle deflector member portion (42) and an inner end, one of said hold members having a slot (54) with a rearward end wall which slideably receives said inner end of said Z-bar.

2. Apparatus for deflecting windshield-blockable material in the atmosphere away from the windshield of a moving vehicle which has a hood in front of the windshield, comprising:
   a holder having mount means for mounting on a vehicle hood location in front of the windshield of the vehicle; and
   a deflector pivotally mounted on said holder, to pivot between an up position wherein said holder lies above the level of said hood location to deflect air away from the windshield and a down position below said up position;

said deflector comprising an elongated laterally-extending member of constant cross-section with opposite ends, said member including a sheet having a rear edge portion forming the walls of most of a substantially cylindrical hole, a middle portion forming the walls of most of a substantially cylindrical hole on the lower face of the sheet, and a forward edge portion which is bent to extend largely downwardly when the deflector is in its down position; and said holder includes a pair of hold members located at either end of said deflector member and pivotally connected to said deflector member, at least a first of said hold members having a longitudinally-extending guide slot with a rearward end wall; and including a Z-rod having a middle portion extending between said first hold member and said deflector member, having a first end portion slideably received in the guide slot of said first hold member, and having a second end portion pivotally received in said hole of said middle deflector member portion; and a pair of pins each having one end extending into said hole of said deflector rear edge portion and another end mounted on a different one of said hold members.

* * * * *